United States Patent Office 3,194,802
Patented July 13, 1965

3,194,802
6-(1-AMINOCYCLOALKANOYLAMINO)-PENICILLANIC ACID
Harvey E. Alburn, West Chester, Norman H. Grant, Wynnewood, and Horace Fletcher 3rd, Pottstown, Pa., assignors to American Home Products Corporation, New York, N.Y., a corporation of Delaware
No Drawing. Filed Feb. 7, 1963, Ser. No. 256,815
5 Claims. (Cl. 260—239.1)

This is a continuation-in-part of application Serial No. 175,828, filed February 26, 1962, now abandoned.

This invention relates to new synthetic penicillins having potent activity against gram-negative and gram-positive micro-organisms.

In our co-pending patent application Serial No. 175,828, there is disclosed a novel method for preparing various penicillanic acid derivatives, including those having the general structural formula:

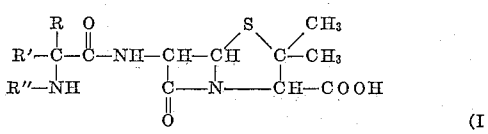

(I)

wherein R, R' and R" each may represent a member selected from the group consisting of hydrogen, aryl, aralkyl, saturated alkyl, unsaturated alkyl, cycloalkyl, and heterocyclic radicals; R and R' may be joined to form a hydrocarbon ring; and R' and R" may be joined to form a heterocyclic ring. As disclosed in our said co-pending patent application Serial No. 175,828, R, R' and R", when separate radicals or forming a ring as defined, may carry substituents such as those disclosed for aryl in said patent application and in U.S.P. 2,985,648 referred to in said application.

The process, described and claimed in said co-pending application, generally comprises the reaction of a 4-substituted-2,5-oxazolidinedione (also known as an N-carboxy amino acid anhydride) with 6-aminopenicillanic acid under controlled conditions. The N-carboxy amino acid anhydride reactant may be represented schematically as follows:

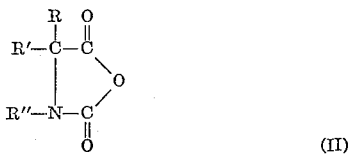

(II)

wherein R, R' and R" each may have the same meaning as stated for general structural Formula I.

The classic methods for preparing the 4-substituted-2,5-oxazolidinediones include (a) the carboalkoxy procedure, (b) the azide rearrangement procedure, and (c) the phosgenation procedure. These methods, of which phosgenation is preferred, have the desirable feature that they do not change the steric configuration when an asymmetric carbon is present. The reaction for preparing the desired 4-substituted - 2,5-oxazolidinedione by the phosgenation of a suitable amino acid as in method (c) may be represented schematically as follows:

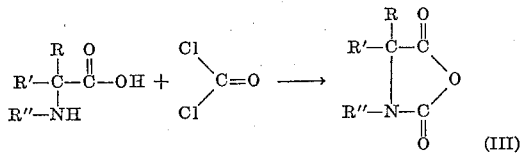

(III)

wherein R, R' and R" each may have the same meaning as stated for Formulae I and II.

Preferably, in said phosgenation procedure, the amino acid reactant is dissolved or suspended in dioxane, phosgene is introduced into the reaction mixture, and the resulting anhydride is crystallized by the addition of an agent such as benzene.

Numerous methods for preparation of the 6-aminopenicillanic acid are now available in the art, including the methods referred to in said U.S.P. 2,985,648 and in U.S.P. 3,032,473, and hence need not be described here.

In the preferred exercise of the method of the present invention, the 4-substituted-2,5-oxazolidinedione chosen is reacted with 6-aminopenicillanic acid in approximately equimolar quantities in a cold aqueous solution in a pH range from about 3.8 to about 6.2 and preferably in the range 4.7–5.7. The mixture is stirred for several hours at a temperature from just above the freezing point of the aqueous mixture to about 37° C., and preferably in the 0-10° C. Although not essential, it may be preferred to include a buffer having an ionic strength of above 0.02, preferably about 0.3, to aid in keeping the reaction mixture within the required pH range. Suitable buffers for maintaining the desired pH may be any mixture of organic or inorganic water-soluble acids, bases, or salts such as sodium acetate-acetic acid, calcium acetate-acetic acid, pyridine-acetic acid, formic acid-ammonia, etc. Alternatively, the reaction mixture may be maintained within the requisite pH range by careful addition of a base such as NaOH or the like.

With the use of the described method, there has now been discovered a series of new penicillanic acid derivatives having the general structural formula:

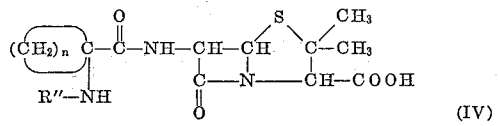

(IV)

wherein $n$ may be a whole number from 2 to 10; and R" may be hydrogen, lower alkyl or substituted lower alkyl, aryl, alkaryl, aralkyl or substituted derivatives thereof; and the cycloalkyl ring may have such substituents thereon as lower alkyl, aryl, alkaryl, aralkyl, alkoxy, hydoxyl, amino and/or halo. The ring may also have a double bond connecting any two carbon atoms.

The new compounds of the series defined above show desirable broad spectrum antibacterial activity and are useful as therapeutical agents in poultry and mammals, including man, in the treatment of infectious diseases caused by gram-positive and gram-negative bacteria, upon either parenteral or oral administration. They also have use as nutritional supplements in animal feed.

The following examples are illustrative of the invention, but are not to be considered necessarily limitative thereof:

Example I

Prepare a mixture of 500 mg. of the N-carboxyanhydride of 1-amino-cyclopentane carboxylic acid and 400 mg. of 6-amino-penicillanic acid in 50 ml. of calcium acetate-acetic acid buffer (pH 5.1, ionic strength 0.3). Stir the mixture for 3 hours and 20 minutes 1° C. Desalt the resulting clear reaction mixture by contacting it with 248 mg. of Amberlite MB–3 resin. Freeze-dry forty-four ml. of the resulting filtrate to give 640 mg. of the product 6-(1 - amino-cyclopentaneamido) - penicillanic acid which shows anti-microbial activity against gram-positive organisms and against gram-negative organisms including those resistant to benzylpenicillin.

Example II

Prepare a mixture of 1 g. of the N-caboxyanhydride of 1-aminocyclpropane carboxylic acid and 08 g. of 6-amino-penicillanic acid in 100 ml. of ice cold water. Adjust the pH to 5.0 by the addition of 10 N NaOH and stir the mixture for 1 hour at 1° C. Filter and freeze-dry the filtrate to form a product possessing broad-spectrum anti-microbial activity as shown by agar serial dilution tests.

Example III

Prepare a mixture of 900 mg. of the N-carboxyanhydride of 1-aminocyclodecane carboxylic acid and 860 mg. of 6-amino-penicillanic acid in 100 ml. of cold water. Adjust the pH to 4.8 with 10 N NaOH and stir the mixture for 1 hour at 1° C. Filter and freeze-dry the filtrate to form a product possessing broad-spectrum anti-microbial activity as shown by agar serial dilution tests.

Example IV

Prepare a mixture of 1 g. of the N-carboxyanhydride of N-methyl-1-aminocyclopentane carboxylic acid and 0.8 g. of 6-aminopenicillanic acid in 100 ml. of ice cold water. Adjust the pH to 5.0 by the addition of 10 N NaOH and stir the mixture in an open vessel for 3 hours at 1° C. Filter and freeze-dry the filtrate to produce a product which shows anti-microbial activity against *Staph. aureus* and *E. coli*.

Example V

Under the conditions of Example IV, use as the N-carboxyanhydride in this case, that of N-ethyl-1-aminocyclobutane carboxylic acid to give a freeze-dried porduct with broad-spectrum antimicrobial activity.

Example VI

Follow the procedure of Example I, substituting as the N-carboxyanhydride, that of 1-amino-cyclobutane carboxylic acid, to prepare a product having broad-spectrum antimicrobial activity.

Example VIII

Again follow the procedure of Example I, employing in this case the N-carboxyanhydride of 1-amino-cyclohexane carboxylic acid, to produce the corresponding penicillin characterized by broad-spectrum antimicrobial activity.

Example VIII

Prepare a penicillin of broad-spectrum antimicrobial activity by the procedure of Example I wherein the N-carboxyanhydride of 1-amino-cyclooctane carboxylic acid is utilized as reactant with 6-aminopenicillanic acid.

As will be understood by those skilled in the art, the compounds of the invention may be utilized in their acid form or in the form of the therapeutically-active salts thereof, e.g., the sodium or potassium salts, or hydrochloride, etc., or in the form of the pharmaceutically-acceptable acid-addition salts prepared by the reaction of the penicillin compounds with an amine or diamine base, e.g., procaine or various N,N'-disubstituted alkylenediamines, such as N,N'-dibenzylethylene-diamine, etc.

We claim:

1. A compound having the formula:

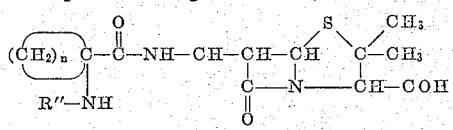

wherein $n$ is a whole number from 2 to 9; and $R''$ is of the of the group consisting of hydrogen and lower alkyl.

2. 6-(1-aminocyclopentaneamido)-penicillanic acid.
3. 6-(1-aminocyclobutaneamido)-penicillanic acid.
4. 6-(1-aminocyclohexaneamido)-penicillanic acid.
5. 6-(1-aminocyclooctaneamido)-penicillanic acid.

References Cited by the Examiner

UNITED STATES PATENTS 3,120,514  2/64  Doyle et al. _____ 260—239.1

NICHOLAS S. RIZZO, *Primary Examiner.*